United States Patent
Shimizu

(10) Patent No.: US 6,786,412 B2
(45) Date of Patent: Sep. 7, 2004

(54) TWO-DIMENSIONAL CODE READING METHOD, TWO-DIMENSIONAL CODE READING PROGRAM, RECORDING MEDIUM WITH TWO-DIMENSIONAL CODE READING PROGRAM, TWO-DIMENSIONAL CODE READING DEVICE, DIGITAL CAMERA AND PORTABLE TERMINAL WITH DIGITAL CAMERA

(75) Inventor: Hajime Shimizu, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/620,374

(22) Filed: Jul. 17, 2003

(65) Prior Publication Data

US 2004/0011872 A1 Jan. 22, 2004

(30) Foreign Application Priority Data

Jul. 18, 2002 (JP) ...................................... 2002-210211

(51) Int. Cl.[7] .................................................. G06K 7/10
(52) U.S. Cl. ............................ 235/462.25; 235/462.24; 235/462.09
(58) Field of Search ....................... 235/462.25, 462.24, 235/462.09

(56) References Cited

U.S. PATENT DOCUMENTS 3,843,875 A * 10/1974 Goodstal et al. ............ 700/160
4,302,775 A * 11/1981 Widergren et al. ..... 375/240.06
4,820,928 A * 4/1989 Ooyama et al. ......... 250/492.2

FOREIGN PATENT DOCUMENTS

| JP | 2742555 B2 | 2/1998 |
| JP | 2000-222517 A | 8/2000 |

* cited by examiner

Primary Examiner—Michael G. Lee
Assistant Examiner—Kimberly D. Nguyen
(74) Attorney, Agent, or Firm—Birch, Stewart, Kolasch & Birch, LLP

(57) ABSTRACT

Coordinate positions of four points are detected from a captured two-dimensional code image. The two-dimensional code size and coefficients of equations are determined for coordinate positions corresponding to center positions of respective cells compensated for inclination of the image by adding depth information. The coordinate positions of respective cell center positions are determined according to the calculation equations by applying the determined coefficients. Brightness/darkness is discriminated from image data corresponding to the respective cell center positions and binary data (0 or 1) for respective cells are generated. Two-dimensional code information is reproduced based on the binary data. The equations are expressed by recurrence formulas. The coefficients determined from the coordinate positions are divided by the same constant to make them integers.

19 Claims, 6 Drawing Sheets

TWO-DIMENSIONAL CODE READING METHOD, TWO-DIMENSIONAL CODE READING PROGRAM, RECORDING MEDIUM WITH TWO-DIMENSIONAL CODE READING PROGRAM, TWO-DIMENSIONAL CODE READING DEVICE, DIGITAL CAMERA AND PORTABLE TERMINAL WITH DIGITAL CAMERA

The present application claims priority under 35 U.S.C. §119 to Japanese Patent Application No. 2002-210211, filed Jul. 18, 2002, the entire disclosure of which is hereby incorporated by reference.

BACKGROUND OF INVENTION

This invention relates to a two-dimensional code reading method, two-dimensional code reading program, recording medium for recording thereon the two-dimensional code reading program, two-dimensional code reading device, digital camera and portable terminal with the digital camera. Specifically, the present invention relates to a two-dimensional code reading method capable of reading accurately and immediately a two-dimensional code image taken obliquely with no contact with the object, two-dimensional code reading program for the same method, recording medium for recording the two-dimensional code reading program and the two-dimensional code reading device for reading a two-dimensional code according to the same method and program.

FIG. 1 shows representative kinds of codes which have been used for encoding information of the tags of products etc. in form of codes readable by computers. In comparison with bar code ("a" in FIG. 1) containing information only in horizontal (or vertical) direction of one-dimension, the two-dimensional code containing information in the vertical and horizontal directions of two dimensions can holds a greater volume of information but requires longer time to read.

There are some methods for two-dimensional code, and the two-dimensional codes may be classified basically into two groups: stack type two-dimensional code (b) and matrix type two-dimensional code (c) as shown in FIG. 1. The stack type two-dimensional code is composed of a number of bar codes holding binary coded data and stacked in multiple layers (rows) in the direction perpendicular to that of arrangement of bars of each bar code. Rows are distinguished from each other by a start code and a stop code provided for each row.

The matrix type two-dimensional code is such that binary coded data is converted into cells that are arranged in two (horizontal and vertical) directions. The display area of the matrix code is represented by a pattern of dark (black) and bright (white) cells (squares in general). The angle and size of the black-and-white cell pattern are read and decoded.

To correctly decode a two-dimensional code, it is necessary to correctly discriminate by brightness/darkness of each bar or each cell. Therefore, it is important to determine a center position of each bar or each cell, which represents the position of data to be read.

An L-type guide cell and cut out symbol are provided for discriminating the direction of a symbol (i.e., two-dimensional code), which allow high-speed reading of two-dimensional code from all directions of 360°.

Representative stack type two-dimensional codes are CODE49, CODE16K and PDF417 and so on and matrix type two-dimensional codes are DATA CODE, QR CODE, MAXI CODE, Veri CODE, CODE1, Array Tag, CP CODE and Carla CODE and so on.

An example of matrix type two-dimensional code is QR code as shown in FIG. 2, which code is defined by JIS standard X0510. FIG. 2 is a view for explaining a summary of the QR code. As shown in FIG. 2, model 2 of QR code has specific position detecting element patterns A, B and C disposed at three corners for detecting the position of the QR code. Furthermore, QR code contains indexing patterns D0, D1, . . . , Dmax (max is model number depending on the number of cells making up QR code) arranged in the area for indexing the positions of respective cells. Timing patterns E and F for guiding the position of each cell are also disposed along the upper side (in a horizontal direction) and the left side (in a vertical direction) of the area of QR code.

In case of two-dimensional matrix code such as QR code, horizontal and vertical inspection lines are set so that they may join two pairs of opposite sides (horizontal sides and vertical sides) through center positions of timing patterns E and F arranged on the respective sides of the code area. In case of two-dimensional stack code made up of a stack of bar codes, an inspection line is set for each bar code by joining a pair of opposite sides in the direction of arrangement of bars of each bar code. In the two-dimensional matrix code, each cell is found at a cross point of respective inspection lines set in the above-described manner and information, and in the two-dimensional stack code, each cell is found at a cross point where an axis of a bar code layer and the inspection line intersect each other, then information contained in the cell is read and decoded for reading two-dimensional code.

FIG. 3 is a flowchart depicting the basic procedure of reading the QR code shown in FIG. 2. In the flowchart of FIG. 3, three position detecting element patterns A, B and C are found first by detecting specific features of position detecting patterns (Step S1), the symbol model number, i.e., the number of cells for recording data (the size of the two-dimensional code) is then detected (Step S2), center positions of respective cells composing the QR code are determined by calculation (Step S3), white (bright) and black (dark) are discriminated from image data corresponding to the respective cell positions and binary coded data "0" or "1" is generated (Step S4 and decoding of the QR code is finally conducted based on the binary coded data of each cell position (Step S5). Generally, since the calculation of cell center position at Step S3 and generation of binary coded data at Step S4 are carried out for each cell, the above sequential steps are repeated (as a double loop in vertical and horizontal directions).

For detecting the coordinate positions (image coordinate positions) of the QR code (Step S1), it is also possible to use additional information such as indexing patterns Di (i=0, 1, . . . , max) and/or timing patterns E and F. Furthermore, QR code is divided into areas based on the indexing patterns Di (i=0, 1, . . . , max) and timing patterns E and F to improve the accuracy of indexing. Alternatively, it is also possible to first detect the timing patterns E and F featured by alternations of bright (white) cell and dark (black) cell arranged between the position detecting element patterns A, B and C and find coordinates of center positions of the cells with respect to the position detecting element patterns A, B, C and timing patterns E, F, by image processing method, then determine the center positions of other cells by calculation using the detected coordinate.

However, it must be noted that the two-dimensional code image can not always be detected without distortion, for example, the two-dimensional code image read aslant may be often distorted. In particular, when the two-dimensional code is read at distance from the recording material (paper in many cases) by a non-contact type apparatus such as a digital camera and a portable telephone with a digital camera incorporated therein, the two-dimensional code image is probably distorted.

In this case, a kind of cell (i.e., information recorded in the cell) for the data cells disposed near to the position detecting element patterns A, B, C, the indexing patterns Di and timing patterns E, F can be accurately read owing to a small difference between the read position determined by calculation and the actual cell position. However, since the deviation of the calculated cell position to read from the actual cell position may be increased as the cell is apart further from the position detecting element patterns A, B, C, the indexing patterns Di and timing patterns E, F, it becomes difficult to accurately discriminate the kind of the cells distant from the above patterns.

A method for accurately reading two-dimensional code aslant read and distorted is disclosed in Japanese Patent Publication No. 2742555.

This method is to devise the setting of inspection lines for determining cell center positions based upon the fact that the distortion of two-dimensional code read at an angle of skew is proportional, to some degree.

In other words, four vertices of an area of a two-dimensional code read at a skew angle is identified by the pattern feature and inclination angle that indicates an inclination of two neighboring sides in the four sides forming the two-dimensional code area is determined first. Based on the position of each inspection line passing through a center position of each cell on one side, an inclination angle formed between each inspection line and each side is determined by proportional distribution from the inclination angle indicating the inclination of the side. A center position of each cell is identified by determining a cross point of respective inspection lines each having a proportionally distributed inclination angle. After this, the kind of the cell is read. To calculate the inclination angle of each inspection line, it is needed to use inverse trigonometric functions featured by a large amount of calculation. Therefore, it requires a large amount of time to identify the center positions of the cells of the two-dimensional code and interpret the two-dimensional code. Similarly, the application of this method to identify the center positions of bar codes of the stack type two-dimensional code also requires a large amount of calculation by using inverse trigonometric functions, resulting in consuming much time until the two-dimensional code is completely interpreted.

Japanese Laid-Open Patent Publication No. 2000-222517 discloses another method featured by processing the inspection lines setting. According to this publication, a method that a two-dimensional code area is considered as a trapezoid satisfying a certain condition and inspection lines for determining the cell position are set by joining respective pairs of dividing points preset on respective pairs of opposite sides of the trapezoid is disclosed. This method is intended to expedite the processing as to setting of inspection lines by eliminating the necessity of calculating an inclination angle at each time for the inspection line setting. Namely, if the two-dimensional code area in an image read can be considered as a trapezoid satisfying a certain condition, a setting position of the dividing point for one side can be set by proportionally distributed based on a ratio of lengths of two adjacent sides.

The above conventional methods are intended to achieve either more accurate reading of the two-dimensional code or shorter time of interpreting the two-dimensional code by devising how to set inspection lines for determining center positions of respective cells.

The method of Japanese Patent Publication No. 2742555 merely concerns how to accurately calculate the center position of each cell and never refers to how much time necessary for interpreting the two-dimensional code. In determining the center positions of respective cells of a two-dimensional code by the method of Japanese Patent Publication No. 2742555, it is needed to perform operations on inverse trigonometric functions each time of determining inclination angle of each inspection line, i.e., an inclination angle of each data cell at a center position of a timing cell. This means that the time required for calculating the inclination of the respective inspection lines may increase excessively in proportion with the number of cells of a two-dimensional code.

On the other hand, the method disclosed in Japanese Laid-Open Patent Publication No. 2000-222517 approximates a two-dimensional code image read as a square to a trapezoid satisfying a certain condition and, therefore, as compared with the method of Japanese Patent Publication No. 2742555, is featured by a shorter time necessary for setting inspection lines and interpreting the two-dimensional code but has lower accuracy of determining the center position of each cell by an intersection point of two inspection lines.

SUMMARY OF THE INVENTION

It is primary object of the present invention is to obtain accurate values of a two-dimensional code by converting a two-dimensional code image taken aslant by a digital camera into a normally taken two-dimensional code image information compensated for inclination of the image using inclination information and at the same time to achieve a considerable saving in time for determining center positions of respective data cells, i.e., for reading the two-dimensional code by using recurrence formulas expressing calculating equations for executing the image conversion.

Another object of the present invention is to provide a two-dimensional code reading method, which comprises processing steps of acquiring an image of a matrix type two-dimensional code composed of binary coded data represented by cells arranged in the horizontal and vertical directions, deciding the two-dimensional code area in the image, setting inspection lines each joining two opposites of 4 sides representing the boundary of the two-dimensional code area, which lines are used for determining center positions of data cells to be read and executing a decoding process to reproduce information of the two-dimensional code based on the inspection lines, wherein coefficients in image position calculating equations for determining coordinate positions of center positions of respective cells of the two-dimensional code compensated for inclination of the image by adding inclination information of the two-dimensional code are calculated for setting the inspection lines on the two-dimensional code image read based on coordinate positions of 4 points of the two-dimensional code area decided by the above two-dimensional code area deciding step.

Another object of the present invention is to provide the two-dimensional code reading method as described above, wherein the image position calculating equations for determining coordinate positions of center positions of respective cells in the two-dimensional code image are expressed by using recurrence formulas regarding the center positions of the respective cells to reduce a volume of calculations for determining the coordinate positions of center positions of respective cells compensated for its image inclination by adding inclination information of the two-dimensional code.

Another object of the present invention is to provide the two-dimensional code reading method as described above, wherein the coefficients in the image position calculating equations when calculating coordinate positions at four corners of the two-dimensional code area are integers obtained by dividing the coefficients by a predetermined same constant, thereby making it possible to determine the coordinate positions of the cell center positions by calculating with integers only.

Another object of the present invention is to provide the two-dimensional code reading method as described above, wherein a constant for dividing the coefficients symbolically determined for the image position calculating equations and selected from constants frequently and commonly used in the image position calculating equations is used to divide and convert the coefficients to smaller in size coefficients for making the two-dimensional code readable.

A further object of the present invention is to provide a two-dimensional code reading method which comprises processing steps of acquiring an image of a stack type two-dimensional code composed of a number of bar codes arranged in multiple layers in a direction perpendicular to a direction of arrangement of bars in each bar code representing data, deciding a two-dimensional code area in the image, setting an inspection line identifying a center position of each of the bar codes and joining one pair of opposite sides, in the direction of arrangement of bars in each bar code, of four sides representing the boundary of the decided two-dimensional code, and executing a decoding process to reproduce information of the two-dimensional code based on the inspection lines set by the inspection line setting processing, wherein coefficients in image position calculating equations for determining coordinate positions of center positions of respective bar codes compensated for the inclination of the image by adding inclination information of the two-dimensional code are calculated for setting the inspection lines on the two-dimensional code image read based on coordinate positions of 4 points within the two-dimensional code area deciding step.

Another object of the present invention is to provide a two-dimensional code reading program which describes the above-described two-dimensional code reading method by program codes executable by a computer.

Another object at the present invention is to provide a program recording medium which is readable by a computer and holding thereon the two-dimensional code reading program described previously.

A further object of the present invention is to provide a two-dimensional code reading device comprising an image capturing portion for capturing an image of a matrix type two-dimensional code composed of binary coded data represented by cells arranged in the vertical and horizontal directions, a two-dimensional code area deciding portion for deciding a two-dimensional code area in the two-dimensional code image, an inspection line setting portion for setting inspection lines identifying a center position of each of the cells, which inspection lines each join one of two pairs of opposites of 4 sides defining the boundary of the decided two-dimensional code area, and a decoding portion for reproducing information of the two-dimensional code based on the inspection lines, wherein the inspection line setting portion based on coordinate positions of 4 points within the two-dimensional code area decided by the two-dimensional code area deciding portion determines coefficients for image position calculating equations for determining coordinate positions of center positions of respective cells in the two-dimensional code compensated for the inclination of the image by adding information on the inclination of the two-dimensional code.

Another object of the present invention is to provide the above-mentioned two-dimensional code reading device in which each of the image position calculating equations for determining the coordinate positions of the center positions of the respective cells in the two-dimensional code image is expressed by a recurrence formula in respect to a center position of each of the cells, thereby realizing reduction of a volume of calculation for determining the coordinate positions of the center positions of respective cells compensated for image inclination by adding the inclination information of the two-dimensional code.

Another object of the present invention is to provide the above-mentioned two-dimensional code reading device in which the coefficients in the image position calculating equations when calculating coordinate positions at four corners of the two-dimensional code area are integers obtained by dividing the coefficients by a predetermined same constant, thereby making it possible to determine the coordinate positions of the cell center positions by calculating with integers only.

Another object of the present invention is to provide the above-mentioned two-dimensional code reading device in which a constant for dividing the coefficients symbolically determined for the image position calculating equations and selected from constants frequently and commonly used in the image position calculating equations is used to divide and convert the coefficients to smaller in size coefficients for making the two-dimensional code readable.

A further object of the present invention is to provide a digital camera incorporating the two-dimensional code reading device.

Still a further object of the present invention is to provide a portable telephone with a digital camera, which incorporates the two-dimensional code reading device.

PREFERRED EMBODIMENT OF THE INVENTION

Referring to accompanying drawings, a two-dimensional code reading method according to an embodiment of the present invention will be described below in detail. The following embodiment is described in case of reading a QR code which is taken by way of example of two-dimensional code. However, the present invention is not limited to the described application and it is of course can be applied to matrix type two-dimensional codes composed of a number of cells each representing a binary coded data and arranged in the horizontal and vertical directions like QR code as well as stack type two-dimensional codes composed of a number of bar codes which represents data stacked in a direction perpendicular to a direction of arrangement of bars, as far as they belong to the scope of the present invention.

Figure 1:
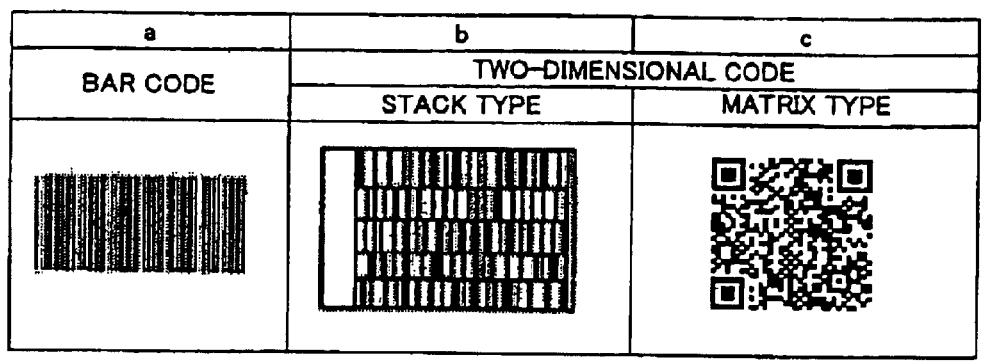
FIG. 1 is a schematic view of representative kinds of codes which have been widely used.
Figure 2:
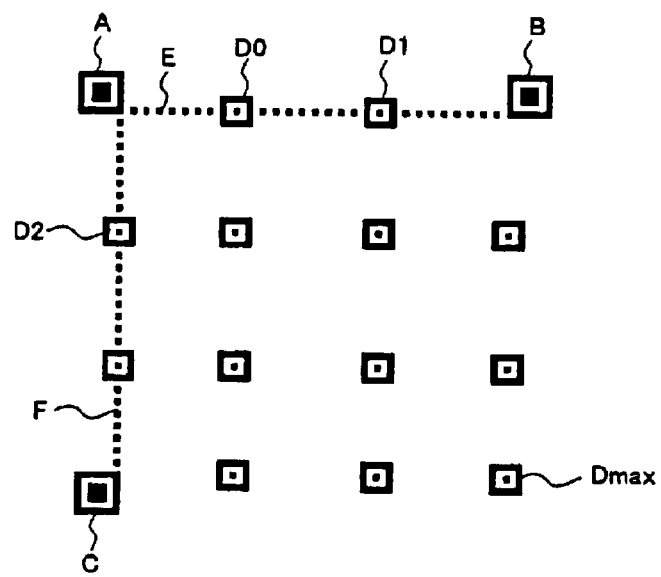
FIG. 2 is a view for explaining a summary of QR code.
Figure 3:
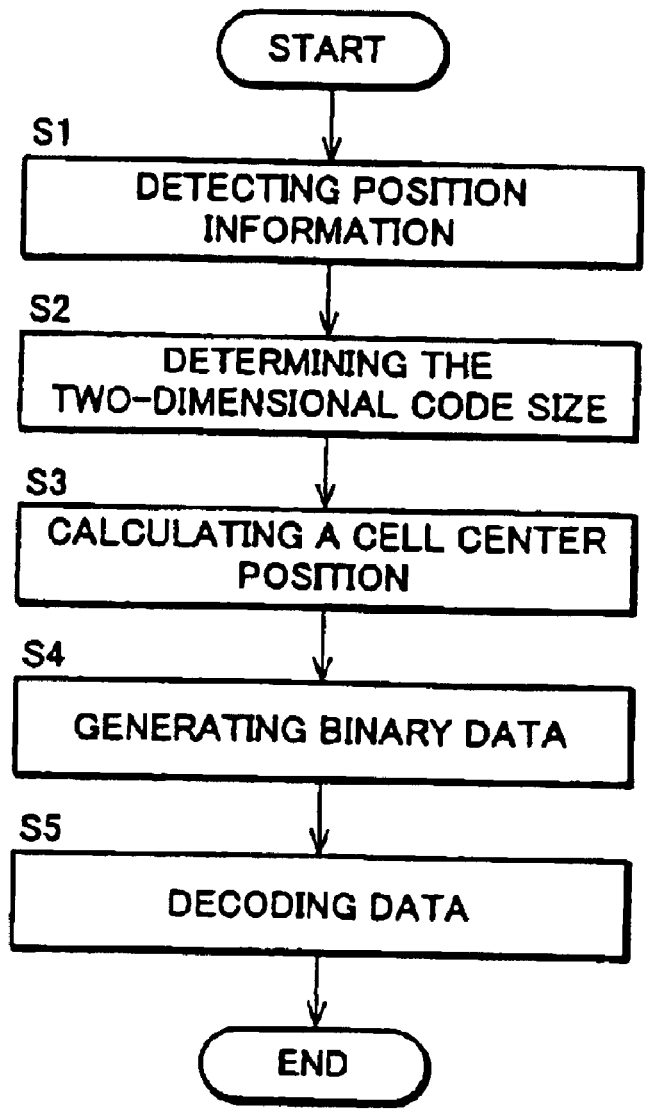
FIG. 3 is a flowchart depicting the basic operation of reading a QR code according to a conventional reading method.

In the description of the embodiment of the present invention, the QR code is composed of "m×m" unit squares which are called "cells" each for recording binary data in the form of a bright (white) or dark (black) square. For example, each of the position detecting element patterns A, B and C shown in FIG. 2 is composed of a black quadrate having 7 cells per side, a white quadrate having 5 cells per side and a black quadrate having 3 cells per side, which quadrates are coaxially superimposed one on the top of another. The QR code image is captured by the digital camera and input into a two-dimensional code reading device (to be described later) whereby the input image is converted to a binary image having either a bright (white) value or a dark (black) value.

Figure 4:
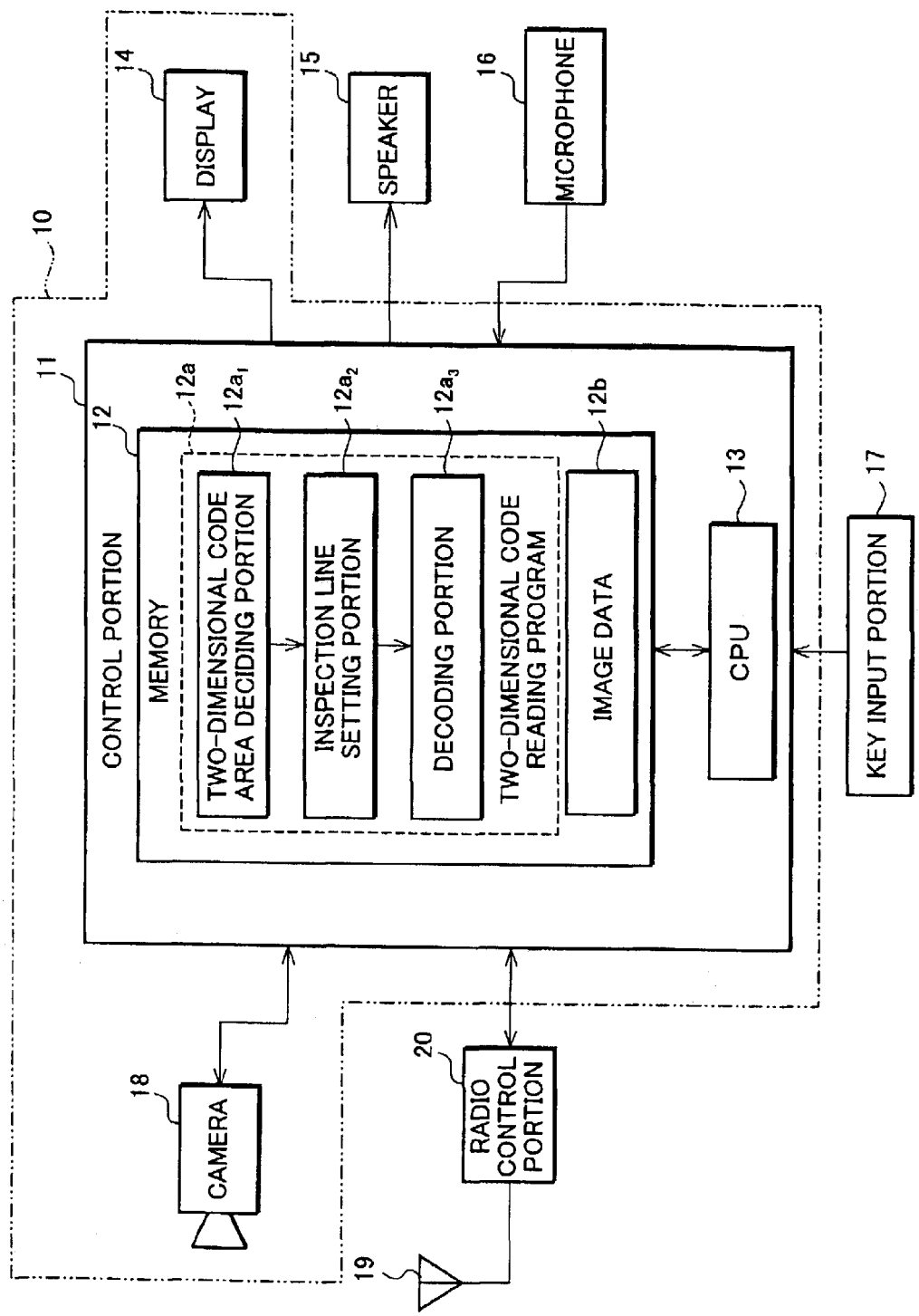
FIG. 4 is a block diagram showing a construction of a two-dimensional code reading device according to an embodiment of the present invention.

FIG. 4 is a block diagram showing a construction of a two-dimensional code reading device according to an embodiment of the present invention. In FIG. 4, there is shown a two-dimensional code reading device 10 including a control portion 11 having a memory 12 and a central processing unit (CPU) 13, a display 14 for displaying image information (two-dimensional code) and a camera (image capturing portion) 18 for taking image information (two-dimensional code). The shown embodiment is an example of inner configuration of the portable telephone with a digital camera incorporated therein (hereinafter referred to as a portable telephone with a digital camera) which has a function as a two-dimensional code reading device 10 and has a speaker 15 for outputting a voice signal, a microphone 16 for inputting a voice signal, a key input portion 17 for inputting information by key operation, an antenna 19 for transmitting/receiving radio waves and a radio control portion 20 for controlling the transmission and reception of radio waves.

In the control portion 11, the memory 12 holds a two-dimensional code reading program 12a for executing functions of the two-dimensional reading device 10 and image data 12b input through the digital camera 18. The CPU 13 reads the two-dimensional code reading program 12a and performs the processing of the two-dimensional code image (image data 12b) according to the program. The two-dimensional code reading program 12a has a two-dimensional code area deciding portion $12a_1$, an inspection line setting portion $12a_2$ and decoding portion $12a_3$.

The portable telephone 10 with a digital camera is capable of transmitting a two-dimensional code image captured by the camera 18 or a result of reading the same image from the radio portion 20 to another portable telephone with a digital camera over a network, etc. and of receiving a two-dimensional code image or a result of reading the same image from another portable telephone with a digital camera over a network, etc. The embodiment may use a server (not shown) which stores the two-dimensional code reading program 12a and performs the processing of reading the two-dimensional code therein. In this case, the server receives the two-dimensional code image from the portable telephone with the digital camera or a personal computer etc. over the networks, performs the processing of reading the two-dimensional code from the received image and returns the processing result.

The two-dimensional code area deciding portion $12a_1$ performs the processing of deciding the two-dimensional code area within the two-dimensional code image captured by the digital camera 18. Next, the inspection line setting portion $12a_2$ performs the processing of setting inspection lines each joining two points on two opposites of four sides forming the boundary of the two-dimensional code area decided by the two-dimensional code area deciding portion $12a_1$ for determining the center positions of respective binary data cells to be read in the two-dimensional code area. Finally, the decoding portion $12a_3$ performs the processing of reproducing the information of the two-dimensional code based on the inspection lines set by the inspection line setting portion $12a_2$.

In case of operating with a stack type two-dimensional code (i.e., bar codes), the two-dimensional code area deciding portion $12a_1$ performs the processing of deciding the two-dimensional code area within the two-dimensional code image captured by the camera 18. Next, the inspection line setting portion $12a_2$ performs the processing of setting an inspection line joining two points on two opposites of four sides forming the boundary of the two-dimensional bar code area decided by the two-dimensional code area deciding portion $12a_1$ for determining the center position of each bar code to be read in the two-dimensional code area. Finally, the decoding portion $12a_3$ performs the processing of reproducing the information of the two-dimensional code based on the inspection lines set by the inspection line setting portion $12a_2$.

The two-dimensional code area, deciding portion $12_{a1}$ detects from the two-dimensional code image captured by the camera 18 four sets of coordinate positions of three position detecting element patterns (A, B and C in FIG. 2) and an indexing pattern (Di in FIG. 2) and determines the size of the two-dimensional code. Next, the inspection line setting portion $12_{a2}$ determines coefficients of the image position compensates for inclination of the image by adding inclination information of the two-dimensional code and determines coefficients in image position calculating equations for determining coordinate position of a center position of each cell compensated for the inclination of the image by adding inclination information of the two-dimensional code, determines the coordinate positions of center positions, of respective cells by applying the corresponding coefficient determined and produces binary data from the image data corresponding to the determined center positions. The decoding portion $12_{a3}$ reproduces the information of two-dimensional code based on the binary data.

Figure 5:
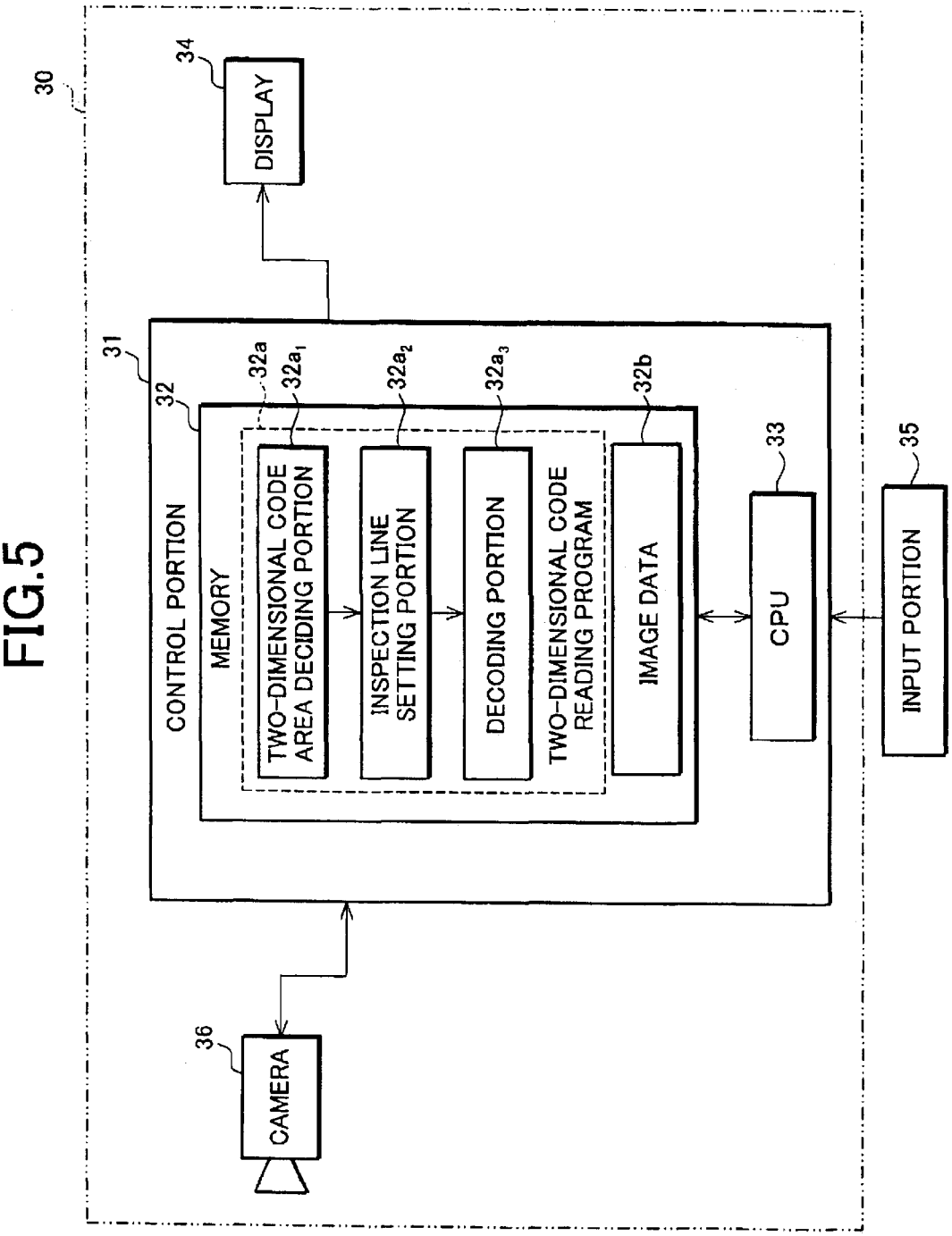
FIG. 5 is a block diagram showing a construction of a two-dimensional code reading device according to another embodiment of the present invention.

FIG. 5 is a block diagram showing a construction of a two-dimensional code reading device according to another embodiment of the present invention. In FIG. 5, there is shown a two-dimensional code reading device 30 including a control portion 31 having a memory 32 and a central processing unit (CPU) 33, a display 34 for displaying image information (two-dimensional code) and a camera (image capturing portion) 36 for taking image information (two-dimensional code). The shown embodiment is an example of inner configuration of the digital camera (hereinafter referred to as a digital camera) which has a function as a two-dimensional code reading device 30 and has an input portion 35 for inputting information, and so on.

In the control portion 31, the memory 32 holds a two-dimensional code reading program 32a for executing functions of the two-dimensional reading device 30 and image data 32b input through the camera 36. The CPU 33 reads the two-dimensional code reading program 32 a and performs the processing of the two-dimensional code image according to the program. The two-dimensional code reading program 32a has a two-dimensional code area deciding portion 32$a_1$, an inspection line setting portion 32$a_2$ and decoding portion 32$a_3$. The operations to be performed by the two-dimensional code area deciding portion 32$a_1$, the inspection line setting portion 32$a_2$ and the deciding portion 32$a_3$ are similar to the operations performed by the two-dimensional code area deciding portion 12$a_1$, the inspection line setting portion 12$a_2$ and the deciding portion 12$a_3$ shown in FIG. 4 and, therefore, will not be described further.

Figure 6:
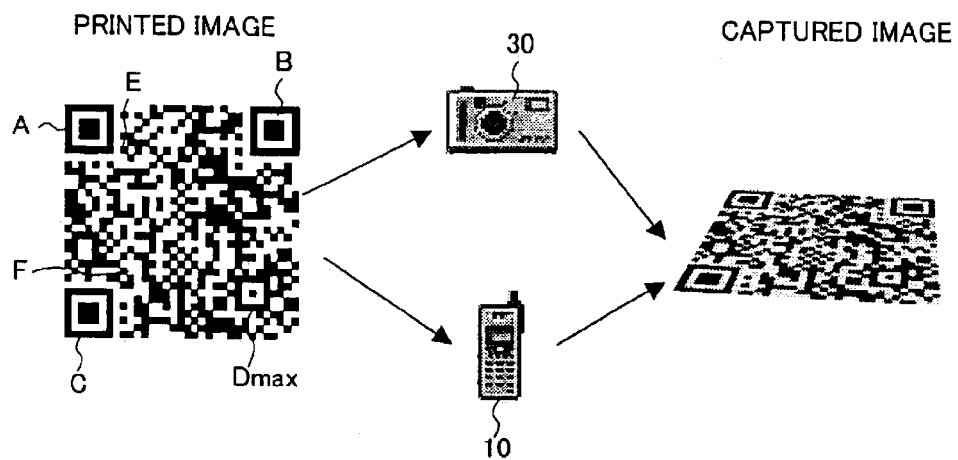
FIG. 6 is an illustrative of reading a printed image of a two-dimensional code by a digital camera and a digital camera incorporated in a portable telephone set at a distance from a two-dimensional code image printed material.

Generally speaking, a two-dimensional code may not always be detected without distortion. For example, the two-dimensional code image read at an angle of skew may be distorted. Specifically, as shown in FIG. 6, in the case of capturing a two-dimensional code recorded on a recording medium (typically, a paper sheet) by the digital camera 30 or a portable telephone 10 with a digital camera at a distance from the surface of the recording medium, the two-dimensional code image thus read (i.e., captured) may probably be distorted, because the two-dimensional code is read in non-contact way. FIG. 6 is a view for explaining the case of reading a printed image of a two-dimensional code by the digital camera 30 or the portable telephone 10 with a digital camera at a distance from the printed image and the case that the two-dimensional code image taken aslant (not at a direct angle thereto) with a space from the printed image may be distorted.

The two-dimensional code reading method according to the present invention makes it possible to read accurately and quickly a two-dimensional code image with distortion as described above, which method will be now described below in detail.

How to determine accurately and rapidly center positions of respective cells composing the two-dimensional code taken aslant and recorded as a distorted image is first described. To achieve a high recognition ratio of reading a matrix type two-dimensional code (or stack type two-dimensional code) taken by the digital camera, it is necessary to convert the image captured not at direct angle to the two-dimensional code image position taken at a direct angle by compensating for the image inclination based on the inclination information.

The compensation for inclination of the image according to the inclination information (i.e., depth information regarding the two-dimensional code) is described as follows. In this instance, if the axis of a lens of the digital camera is supposed as an origin O and the depth direction is designated by z, an object plane (correct image plane) Π perpendicular to the optical axis on which the camera lens has a focus point is given by z=a.

It is assumed that a two-dimensional code was taken in a state slanting from the correct image plane Π perpendicular to the optical axis. If the two-dimensional code was laid on the correct image plane Π, the position P (u, v, a) in the slanting state would exist at position Q (x, y, z). These two positions are in a relationship of affine transformation in three-dimensional space, which relationship can be expressed by the following equation (1) using homogeneous coordinates.

$$\begin{bmatrix} x \\ y \\ z \\ 1 \end{bmatrix} = \begin{bmatrix} a00 & a01 & a02 & a03 \\ a10 & a11 & a12 & a13 \\ a20 & a21 & a22 & a23 \\ 0 & 0 & 0 & 1 \end{bmatrix} \cdot \begin{bmatrix} u \\ v \\ a \\ 1 \end{bmatrix} \qquad (1)$$

On the other hand, any position on the image actually taken is a point at which line segment joining the origin O with position Q intersects the object plane Π. Expressing the position as R (X, Y, a), the following relations are obtained.

$$X=(a \cdot x)/z \qquad (2)$$

$$Y=(a \cdot y)/z \qquad (3)$$

x and y of the Equation (1) are substituted into equations (2) and (3), then $$X=\{a \cdot (a00 \cdot u+a01 \cdot v+a02 \cdot a+a03)\}/(a20 \cdot u+a21 \cdot v+a22a+a23) \qquad (4)$$

$$Y=\{a \cdot (a10 \cdot u+a11 \cdot v+a12 \cdot a+a13)\}/(a20 \cdot u+a21 \cdot v+a22 \cdot a+a23) \qquad (5)$$

where a is a constant and, therefore, there are nine unknown values {a00, a10, a01, a11, (a02·a+a03), (a12·a+a13), a20, a21, (a22·a+a23)}.

If a20≠0 and then $$b00=(a \cdot a00)/a20 \qquad (6)$$

$$b01=(a \cdot a01)/a20 \qquad (7)$$

$$b02=\{a \cdot (a02 \cdot a+a03))/a20 \qquad (8)$$

$$b21=(a \cdot a21)/a20 \qquad (9)$$

$$b10=(a \cdot a10)/a20 \qquad (10)$$

$$b11=(a \cdot a11)/a20 \qquad (11)$$

$$b12=\{a \cdot (a12 \cdot a+a13)\}/a20 \qquad (12)$$

$$b22=\{a \cdot (a22 \cdot a+a23)\}/a20 \qquad (13),$$

The equations (4) and (5) can be expressed as:

$$(b00 \cdot u+b01 \cdot v+b02)=X \cdot (u+b21 \cdot v+b22) \qquad (14)$$

$$(b10 \cdot u+b11 \cdot v+b12)=Y \cdot (u+b21 \cdot v+b22) \qquad (15).$$

Therefore, if coordinates (X, Y) of the image, which correspond to positions (u, v) of four suitably selected cells, are obtained, then the simultaneous equations (14) and (15) can be solved. Eight coefficients b00, b01, b02, b10, b11, b12, b21 and b22 are now obtained.

On the other hand, if a20=0, the number of unknown values is 8. Similarly, if coordinates (X, Y) of the image, which correspond to positions (u, v) of four cells, are obtained, then the above simultaneous equations can also be solved.

Since the equations can be solved in both cases of a20 being equal to 0 or not equal to 0, the equations. (4) and (5) can be replaced by the following equations using the above-described values.

$$A=c00 \cdot u+c01 \cdot v+c02 \qquad (16)$$

$$B=c10 \cdot u+c11 \cdot v+c12 \qquad (17)$$

$$C=c20 \cdot u+c21 \cdot v+c22 \qquad (18)$$

$$X=A/C \qquad (19)$$

$$Y=B/C \qquad (20).$$

Furthermore, if the image coordinate position corresponding to the cell center position (u0, v0) is (x0, Y0), the equations can be replaced by the following equations:

$$A' = c00 \cdot (u-u0) + c01 \cdot (v-v0) \tag{16'}$$

$$B' = c10 \cdot (u-u0) + c11 \cdot (v-v0) \tag{17'}$$

$$C' = c20 \cdot (u-u0) + c21 \cdot (v-v0) \tag{18'}$$

$$X = X0 + A'/C' \tag{19'}$$

$$Y = Y0 + B'/C' \tag{20'}$$

Since A, B and C can be expressed by recurrence formulas with respect to cell center positions (u, v), the calculation for determining the image position corresponding to a center position of each cell i.e., image coordinate position (X, Y) can be performed by three times of addition and two times of division, then the speed of calculation would be fast.

(The First Embodiment)

Figure 7:
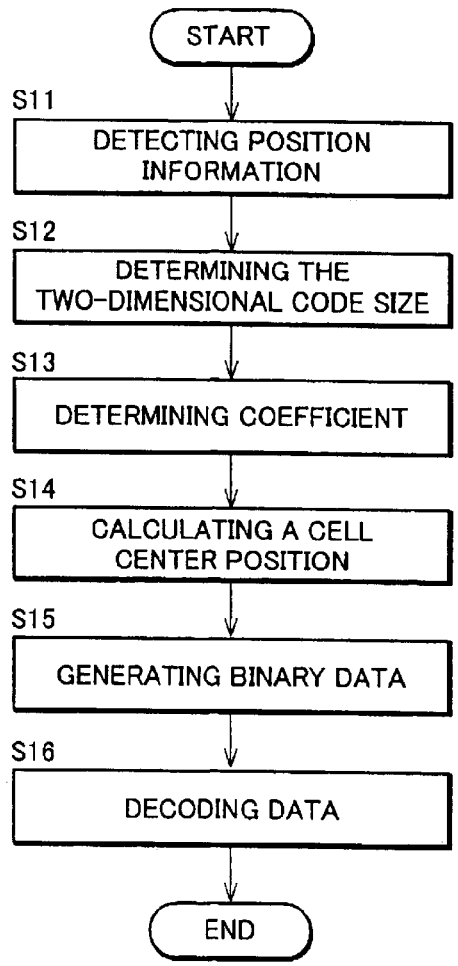
FIG. 7 is a flowchart depicting the processing steps of a two-dimensional code reading method according to the first embodiment of the present invention.

The first embodiment of the present invention, which realizes the above-described two-dimensional code reading method, will be described below. FIG. 7 is a flowchart depicting the process of the first embodiment regarding the two-dimensional code reading method of present invention. This embodiment is for explaining the representative example to be carried out the process of two-dimensional code reading based upon, the two-dimensional code reading device 10 shown in FIG. 4. In FIG. 7, the two-dimensional code area deciding portion $12a_1$ detects, from the featuring patterns of the two-dimensional code, four coordinate positions (image coordinate position) including three position detecting element patterns A, B and C and one indexing pattern (one of indexing patterns Di (i=0, 1, . . . , 9)) (Step S11) and then determines the symbol model number of the two-dimensional code, which represents the size of the two-dimensional code (Step S12). In other words, a two-dimensional code area in the image is determined in Step S11 and the number of cells of the detected two-dimensional code is determined in Step S12.

The inspection line setting portion $12a_2$ determines coefficients (c00 to c22) of equations (16) to (18) by substituting into equations (16) to (20) the coordinate positions (X, Y) of 4 patterns (image coordinate positions) detected in Step S11 and the center positions (u, v) of respective cells corresponding to the coordinate positions, which positions can be obtained from the symbol model number detected in Step S11 (Step S13). Furthermore, the inspection line setting portion $12a_2$ determines (in Step S14) the coordinate position (image coordinate position) of the center position of respective cells other than 4 patterns in the two-dimensional code according to equations (16) to (20) by applying the coefficients determined in Step S13. The portion discriminates whether each cell is bright (white) or dark (black) from the image data corresponding to the obtained coordinate position (image coordinate position) and generates binary bit data "0" or "1" for each of the cells (Step S15). Finally, the decoding portion $12a_3$ reproduces information of the two-dimensional code based on the binary data generated for each of the cells (Step S16).

Namely, Step S13 performs the processing of determining the center position of respective data cells within the two-dimensional code area decided in Step S11 by setting inspection lines for determining center position of each data cell between each of two opposite pairs of 4 sides of the matrix type two-dimensional code or by setting inspection lines between a pair of opposite sides in the direction of arrangement of bars. The inspection lines for identifying the cell center positions of the two-dimensional code are determined by calculating coefficients of image position calculating equations for determining cell center positions of the two-dimensional code compensated for inclination of the image based on the coordinate position of the decided two-dimensional code area (i.e., the coordinate position of the two-dimensional code in the image, which is also called image coordinate position), and the cell center positions of the corresponding two-dimensional code and by adding depth information as to the two-dimensional code image taken aslant. This determines the coordinate position of each cell center position corresponding to the inclination of the inspection lines.

Figure 8:
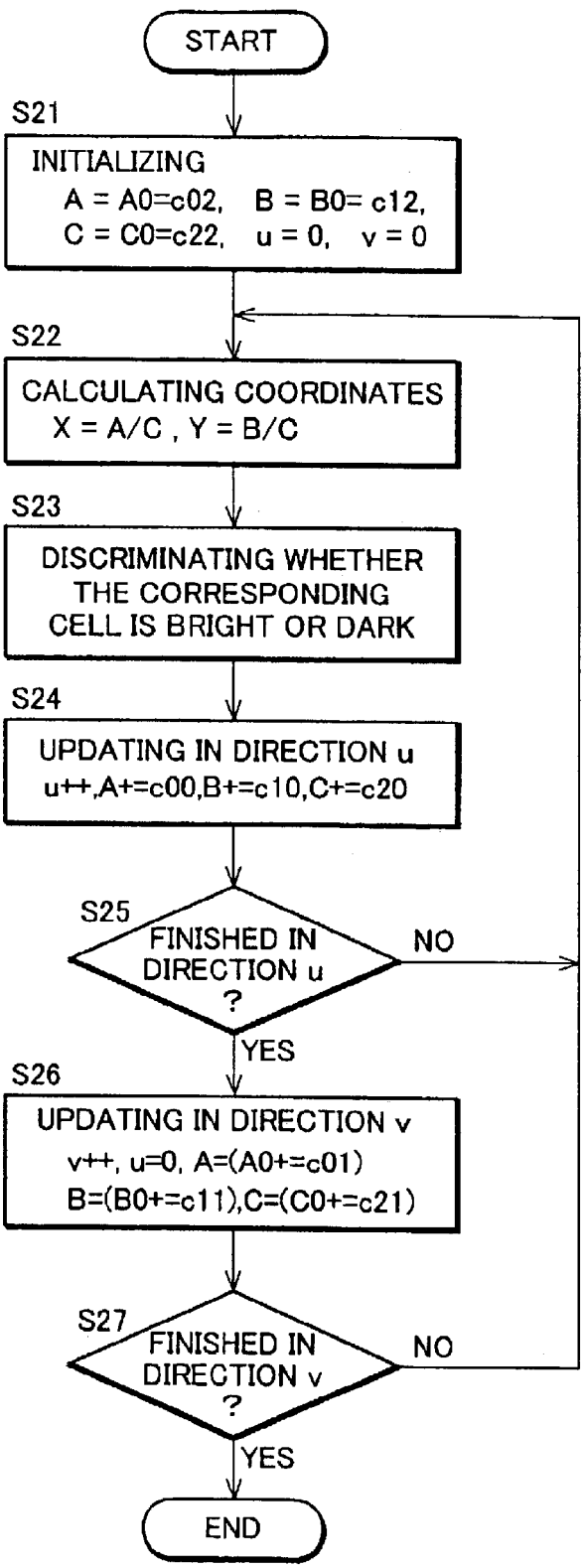
FIG. 8 is a flowchart depicting steps of determining coordinate position of a center position of each cell (image coordinates position).

Referring now to FIG. 8, the processing of determining the coordinate position of each cell center position (image coordinate position)(i.e., Step S14 of FIG. 7) is further described below. FIG. 8 is a flowchart depicting an exemplary procedure of determining the coordinate position (image coordinate position) of the center position of each cell, which procedure uses recurrence formulas A, B and C.

In FIG. 8, the inspection line setting portion $12a_2$ first initializes variables in equations (16) to (20) (Step S21). Variables to be initialized are v and u (both to be set at 0) which correspond to a row number and a column number, respectively, of each of cells composing the two-dimensional code and initial values A0, B0 and C0 (values of A, B, C when u=0 and v=0) of A, B and C in the recurrence formulas in the direction of v (row).

Namely, A=A0=c02, B=B0=c12, C=C0=c22 are given by substituting v=0 and u=0 into equations (16) to (18).

Next, the inspection line setting portion $12a_2$ calculates coordinate position (image coordinate position) of the center position of each cell in the two-dimensional code image according to equations (19) and (20) (Step S22).

In the initial state with v=0 and u=0, $$X = A/C = A0/C0 = c02/c22 \tag{21}$$

$$Y = B/C = B0/C0 = c12/c22 \tag{22}$$

Furthermore, the inspection line setting portion $12a_2$ discriminates whether the cell is bright (white) or dark (black) from image data of the coordinate position (image coordinate position) corresponding to X, Y and generates binary data ("0" or "1") for the corresponding cell (Step S23).

Various methods may be used for determining a bright value and a dark value. For example, there is known the nearest method for obtaining a pixel value of a pixel nearest to the coordinate position (image coordinate position) by cutting off or rounding a fraction, the bilinear method for performing linear interpolation with the pixel values of 4 pixels neighboring to the position information by using a fraction of the coordinate position (image coordinate position) and the bi-cubic method for achieving more accurate approximation.

Next, the inspection line setting portion $12a_2$ updates in the direction "u" (column direction) (Step S24). Namely, value u is incremented by 1 and A, B, C are updated. As apparent from equations (16) to (18), if u is increased by 1, then displacement of c00, c10 and c20 are added to A, B and C respectively, which are expressed by using C language as A+=c00, B+=c10, C+=c20 in Step S24.

The inspection line setting portion $12a_2$ discriminates whether the updating of values in the direction "u" (column direction) of the two-dimensional code is completed or not (Step S25). If value "u" does not exceed the boundary of the two-dimensional code area ("No" in Step S25), the portion returns to Step S22 and repeats the same processing. If the value "u" exceeded the boundary of the two-dimensional code area ("YES" in Step S25), the updating of values in the direction "v" (row) is conducted (Step S26).

v is increased by 1 and u (column) is reset to 0, then A(A0), B(B0) and C (C0) are updated. Namely, as apparent from equations (16) to (18), as the result of increasing "v" by 1 and updating A(A0), B(B0) and C(C0), A, B and C are increased by addition of displacement values of c01, c11 and c21 respectively, which are expressed by using C language as A0+=c01, B0+=c11 and C0+=c21 respectively (Step S26).

Finally, the inspection line setting portion $12a_2$ discriminates whether the updating of values in the direction "v" (row direction) of the two-dimensional code is completed or not (Step S27). If value "v" does not exceed the boundary of the two-dimensional code area ("No" in Step S27), the portion returns to Step S22 and repeats the same processing. If the value "v" exceeded the boundary of the two-dimensional code area ("YES" in Step S27), the processing is finished.

An example of determining coefficients (c00 to c22) in equations (16) to (18) as shown in Step S13 of FIG. 7 is described below. Three of four coordinate positions (image coordinate positions) detected in Step S11 of FIG. 7 are of the position detection element patterns A, B and C in an exemplary QR code shown in FIG. 2. The remaining coordinate position (image coordinate position) is any one of indexing patterns Di. Generally, a two-dimensional code is provided with a plurality of indexing patterns Di as shown in the example of QR code of FIG. 2. It is assumed to select one of the indexing patterns Di, which is most apart from the three position detecting element patterns A, B and C respectively (i.e., the indexing pattern Dmax in the example of QR code shown in FIG. 2).

Now, assume that the two-dimensional code has a size of m×m cells, and each of the position detecting element patterns A, B and C has a size of 7×7 cells (i.e., the patterns A, B, and C are disposed inside by 4×4 cells from the corresponding corner of the two-dimensional code) an the indexing pattern Dmax is disposed inside by 7×7 cells from the remaining corner of the two-dimensional code. In the above arrangement of the patterns, the coordinates of the cell, center position corresponding to the, four coordinate positions (image coordinate positions) are expressed as (3, 3, a) for the position detecting element pattern A, (m−4, 3, a) for the position detecting element pattern B, (3, m−4, a) for the position detecting element pattern C, (m−7, m−7, a) for the indexing pattern Dmax.

Center positions of respective cells can be determined from 4 coordinate positions (image coordinate positions) and coordinates of corresponding cell center position by numerical calculation by using for example the Gauss method. However, in view of time and accuracy of calculation (division shall be conducted many times), it is preferable to find typical solutions symbolically in advance.

In the case of finding the typical solutions symbolically in advance by using 4 coordinate positions (image coordinate positions) of the position detecting element patterns A, B, C and the indexing patter Dmax, which are represented as (X0, Y0), (X1, Y1), (X2, Y2) and (X3, Y3) respectively, coefficients (c00 to c22) of equations (16) to (18) are given by the following equations (23) to (31).

$$c00 = Y0 \cdot (13-m) \cdot X1 \cdot (X2-X3) + \\ Y1 \cdot (-10+m) \cdot X0 \cdot (X2-X3) + \\ Y2 \cdot \{-3 \cdot X1 \cdot (X0-X3) - (10-m) \cdot X3 \cdot (X0-X1)\} + \\ Y3 \cdot \{3 \cdot X1 \cdot (X0-X2) + (10-m) \cdot X2 \cdot (X0-X1)\} \quad (23)$$

$$c01 = Y0 \cdot (-13+m) \cdot X2 \cdot (X1-X3) + \\ Y1 \cdot \{3 \cdot X2 \cdot (X0-X3) + (10-m) \cdot X3 \cdot (X0-X2)\} + \\ Y2 \cdot (10-m) \cdot X0 \cdot (X1-X3) + \\ Y3 \cdot \{-3 \cdot X2 \cdot (X0-X1) - (10-m) \cdot X1 \cdot (X0-X2)\} \quad (24)$$

$$c02 = Y0 \cdot 3 \cdot (13-m) \cdot X3 \cdot (X1-X2) + \\ Y1 \cdot \{(-1) \cdot (10-m) \cdot (1-m) \cdot X0 \cdot (X2-X3) - \\ 3 \cdot (13-m) \cdot X2 \cdot (X0-X3)\} + \\ Y2 \cdot \{(10-m) \cdot (1-m) \cdot X0 \cdot (X1-X3) + \\ 3 \cdot (13-m) \cdot X1 \cdot (X0-X3)\} + \\ Y3 \cdot (-1) \cdot (7-m)^2 \cdot X0 \cdot (X1-X2) \quad (25)$$

$$c10 = X0 \cdot (-13+m) \cdot Y1 \cdot (Y2-Y3) + \\ X1 \cdot (10-m) \cdot Y0 \cdot (Y2-Y3) + \\ X2 \cdot \{3 \cdot Y1 \cdot (Y0-Y3) + (10-m) \cdot Y3 \cdot (Y0-Y1)\} + \\ X3 \cdot \{-3 \cdot Y1 \cdot (Y0-Y2) - (10-m) \cdot Y2 \cdot (Y0-Y1)\} \quad (26)$$

$$c11 = X0 \cdot (13-m) \cdot Y2 \cdot (Y1-Y3) + \\ X1 \cdot \{-3 \cdot Y2 \cdot (Y0-Y3) - (10-m) \cdot Y3 \cdot (Y0-Y2)\} + \\ X2 \cdot (-10+m) \cdot Y0 \cdot (Y1-Y3) + \\ X3 \cdot \{3 \cdot Y2 \cdot (Y0-Y1) + (10-m) \cdot Y1 \cdot (Y0-Y2)\} \quad (27)$$

$$c12 = X0 \cdot 3 \cdot (-13+m) \cdot Y3 \cdot (Y1-Y2) + \\ X1 \cdot \{(10-m) \cdot (1-m) \cdot Y0 \cdot (Y2-Y3) + \\ 3 \cdot (13-m) \cdot Y2 \cdot (Y0-Y3)\} + \\ X2 \cdot \{(-1) \cdot (10-m) \cdot (1-m) \cdot Y0 \cdot (Y1-Y3) - \\ 3 \cdot (13-m) \cdot Y1 \cdot (Y0-Y3)\} + \\ X3 \cdot (7-m)^2 \cdot Y0 \cdot (Y1-Y2) \quad (28)$$

$$c20 = X0 \cdot (-13+m) \cdot (Y2-Y3) + \\ X1 \cdot (10-m) \cdot (Y2-Y3) + \\ X2 \cdot \{(10-m) \cdot (Y0-Y1) + 3 \cdot (Y0-Y3)\} + \\ X3 \cdot \{(-10+m) \cdot (Y0-Y1) - 3 \cdot (Y0-Y2)\} \quad (29)$$

$$c21 = X0 \cdot (13-m) \cdot (Y1-Y3) + \\ X1 \cdot \{(-10+m) \cdot (Y0-Y2) - 3 \cdot (Y0-Y3)\} + \\ X2 \cdot (-10+m) \cdot (Y1-Y3) + \\ X3 \cdot \{(10-m) \cdot (Y0-Y2) + 3 \cdot (Y0-Y1)\} \quad (30)$$

$$c22 = X0 \cdot 3 \cdot (-13+m) \cdot (Y1-Y2) + \\ X1 \cdot \{(10-m)^2 \cdot (Y2-Y3) + 3 \cdot (13-m) \cdot (Y0-Y3)\} + \\ X2 \cdot \{(-1) \cdot (10-m)^2 \cdot (Y1-Y3) - 3 \cdot (13-m) \cdot (Y0-Y3)\} + \\ X3(7-m)^2 \cdot (Y1-Y2) \quad (31)$$

Since m is (a multiple of 4 plus 1) owing to the property of QR code, it may have the following expression:

$$m = 4 \cdot n + 13 \quad (32)$$

Therefore, $$YX01 = Y0 \cdot X1 - Y1 \cdot X0 \quad (33)$$

$$YX02 = -Y0 \cdot X2 + Y2 \cdot X0 \quad (34)$$

$$YX03 = Y0 \cdot X3 - Y3 \cdot X0 \quad (35)$$

$$YX12 = Y1 \cdot X2 - Y2 \cdot X1 \quad (36)$$

$$YX13 = -Y1 \cdot X3 + Y3 \cdot X1 \quad (37)$$

$$YX23 = Y2 \cdot X3 - Y3 \cdot X2 \quad (38)$$

Furthermore, $$r = 16 \cdot n^2 + 48 \cdot n + 36 \tag{39}$$
$$= 4 \cdot n \cdot (4 \cdot n + 12) + 36$$

Since $$cxx = YX12 + YX13 + YX23 \tag{40}$$

$$cyy = YX01 + YX02 + YX12 \tag{41}$$

Therefore, coefficients of equations (23) to (31) can be given by the following equations (42) to (50).

$$c00 = 3 \cdot X0 \cdot cxx + 4 \cdot n \cdot \{(X3-X2) \cdot YX01 + (X0-X1) \cdot YX23\} \tag{42}$$

$$c01 = 3 \cdot X0 \cdot cxx + 4 \cdot n \cdot (X3-X1) \cdot YX02 + (X0-X2) \cdot YX13\} \tag{43}$$

$$c02 = -r \cdot X0 \cdot cxx - 12 \cdot n \cdot X3 \cdot cyy \tag{44}$$

$$c10 = 3 \cdot Y0 \cdot cxx + 4 \cdot n \cdot \{(Y3-Y2) \cdot YX01 + (Y0-Y1) \cdot YX23\} \tag{45}$$

$$c11 = 3 \cdot Y0 \cdot cxx + 4 \cdot n \cdot (Y3-Y1) \cdot YX02 + (Y0-Y2) \cdot YX13\} \tag{46}$$

$$c12 = -r \cdot Y0 \cdot cxx \cdot 12 \cdot n \cdot Y3 \cdot cyy \tag{47}$$

$$c20 = 3 \cdot cxx + 4 \cdot n \cdot (YX02 + YX03 + YX12 + YX13) \tag{48}$$

$$c21 = 3 \cdot cxx + 4 \cdot n \cdot (YX01 - YX03 + YX12 + YX23) \tag{49}$$

$$c22 = -r \cdot cxx - 12 \cdot n \cdot cyy \tag{50}$$

Namely, coefficients (c00 to c22) of equations (16) to (18) can be determined by performing relatively simple calculations using equations (42) to (50). Image position calculating equations for determining coordinate positions of respective cell center positions can be thus expressed by using recurrence formulas. A volume of calculations for determining coordinate positions corresponding to the cell center positions compensated for inclination of the image by adding the depth information for the two-dimensional code can be considerably reduced. In the other words, this method can immediately read a two-dimensional code by simplified calculations.

(The Second Embodiment)

The second embodiment of the present invention, which carries out the above-described two-dimensional code reading method by using a portable telephone 10 with a digital camera as shown in FIG. 4, will be described below. Since portable terminals like the portable telephone 10 with a digital camera incorporate a relatively small digital camera and relatively low-performance CPU and do not include a floating point processor, it is desirable to read two-dimensional code by calculation with integer calculation only. In the above-described equations (4) and (5), even if each of coefficients (a00 to a 23) is divided by the same constant, it becomes to divide a denominator and a numerator by a same constant and therefore it is apparent that the results of calculations for determining X and Y are the same. Therefore, the coordinate position (image coordinate position) X, Y of each cell center may be calculated with integer calculation only by setting in advance a constant that allows the coordinate positions (image coordinate positions) at four corner points (0, 0), (0, m), (m, 0), (m, m) of a two-dimensional code made up of m×m cells to have an integer denominator and an integer numerator. The above-described processing is conducted by the inspection line setting portion $12a_2$ of the potable telephone 10 with the digital camera.

(The third Embodiment)

It is also possible to select suitable constants for dividing coefficients (c00 to c22) of equations (16) to (18) based upon the result of analysis of the equations used for obtaining symmetrically typical solution of coefficients. For example, coefficients (c00 to c22) described in the first embodiment of the present invention have expressions which contain (4·n) as seen in equations (42) to (50) for expressing coefficients (c00 to c02). Therefore, it is possible to find coefficients (c00 to c22) suitable for a relatively small-size display screen, i.e., a small-size two-dimensional code by dividing all coefficients by (4·n) or a multiple of (4·n). Expressions of respective coefficients (c00 to c22) of equations (42) to (50) are divided by (4·n) to convert to smaller coefficient (c00' to c22') which indicate the two-dimensional code. The resultants are shown in the following equations (51) to (59). The above-described processing is carried out by the inspection line setting portion $12a_2$ of the portable telephone 10 with a digital camera.

$$c00' = \{(3 \cdot X0 \cdot cxx)/(4 \cdot n)\} + \tag{51}$$
$$\{(X3 - X2) \cdot YX01 + (X0 - X1) \cdot YX23\}$$

$$c01' = \{(3 \cdot X0 \cdot cxx)/(4 \cdot n)\} + \tag{52}$$
$$\{(X3 - X1) \cdot YX02 + (X0 - X2) \cdot YX13\}$$

$$c02' = -\{(9/n) - (4 \cdot n + 12)\} \cdot X0 \cdot cxx - 3 \cdot X3 \cdot cyy \tag{53}$$

$$c10' = \{(3 \cdot Y0 \cdot cxx)/(4 \cdot n)\} + \tag{54}$$
$$\{(Y3 - Y2) \cdot YX01 + (Y0 - Y1) \cdot YX23\}$$

$$c11' = \{(3 \cdot Y0 \cdot cxx)/(4 \cdot n)\} + \tag{55}$$
$$\{(Y3 - Y1) \cdot YX02 + (Y0 - Y2) \cdot YX13\}$$

$$c12' = -\{(9/n) - (4 \cdot n + 12)\} \cdot Y0 \cdot cxx - 3 \cdot Y3 \cdot cyy \tag{56}$$

$$c20' = (3 \cdot cxx)/(4 \cdot n) + (YX02 + YX03 + YX12 + YX13) \tag{57}$$

$$c21' = (3 \cdot cxx)/(4 \cdot n) + (YX01 - YX03 + YX12 + YX23) \tag{58}$$

$$c22' = -\{(9/n) - (4 \cdot n + 12)\} \cdot cxx - 3 \cdot cyy \tag{59}$$

While the present invention has been particularly described with embodiments for implementing the inventive method for performing the processing steps of the two-dimensional code reading, it can also be embodied as a two-dimensional code reading device capable of performing the processing steps of the two-dimensional code reading method or a digital camera incorporating the two-dimensional code reading device or a portable telephone with a digital camera. It is also possible to implement the present invention as a program of the two-dimensional code reading expressed by program code which can be executed by computer and a recording medium recorded the two-dimensional code reading program and data. The present invention can be embodied as a transmitting medium such as a communication network for transmitting and receiving the two-dimensional code reading program and data.

The following is an embodiment of a recording medium on which the program and data necessary for executing the two-dimensional code reading method of the present invention are recorded. Various kinds of recording media may be used for example, CD-ROM (-R/RW), optical magnetic disk, DVD-ROM, FD, flash memory, memory card, memory stick, ROM, RAM and so on. These recording media each holding a program for executing the two-dimensional code reading method of the present invention by computer may be widely spread and used to easily implement the method. The recording medium can be mounted on an information processing device such as a computer program is loaded and executed in the information processing device and/or the program is stored in a recording medium equipped in the information processing device and executed in the information processing device for use as the need be. The two-dimensional code recording method according to the present invention can be thus executed anytime as the need be.

According to the present invention, it is possible to convert a two-dimensional code taken aslant by a digital camera to a right front image information of the two-dimensional code by compensating for inclination of the image based on inclination information and thereby to obtain more precise values of the two-dimensional code and considerably shorten the time necessary for reading the two-dimensional code by expressing the image converting equations by recurrence formulas.

What is claimed is:

1. A two-dimensional code reading method comprising processing steps of:

acquiring an image of a two-dimensional matrix code composed of a number of cells arranged in vertical and horizontal directions to form a matrix of the cells each representing binary coded data, deciding a two-dimensional matrix code area in the image, and setting inspection lines identifying a center position of each of the cells, said inspection lines each joining two paired opposites of four sides defining a boundary of the decided two-dimensional matrix code area and reproducing information of the two-dimensional matrix code based on the inspection lines set by the inspection line setting processing, wherein coefficient in image position calculating equations for calculating coordinate positions of center positions of respective cells in the two-dimensional matrix code compensated for image inclination by adding inclination information for the two-dimensional matrix code re calculated for setting the inspection lines on the two-dimensional matrix code image based on coordinate positions of four points within the two-dimensional matrix code area decided by the two-dimensional matrix code area deciding step.

2. The two-dimensional code reading method as defined in claim 1, wherein each of the image position calculating equations to determining the coordinate positions of the center positions of he respective cells in the two-dimensional matrix code image is expressed by a recurrence formula with respect to a center position of each of the cells to reduce a volume of calculation for determining the coordinate positions of the center positions of respective cells compensated for image inclination by adding the inclination information of the two-dimensional matrix code.

3. The two-dimensional code reading method as defined in claim 2, herein coefficients in the image position calculating equations for calculating coordinate positions at four corners of the two-dimensional matrix code area are divided by a predetermined same cons ant to make integers and the coordinate positions of the cell center positions are determined by calculation with the integers only.

4. The two-dimensional code reading method as defined in claim 2, wherein a constant for dividing the coefficients symbolically determined for the image position calculating equations an selected from constants frequently and commonly used in the image position calculating equations is used to divide and convert the coefficients to smaller in size coefficients to make the two-dimensional matrix code readable.

5. The two-dimensional code reading method as defined in claim 1, herein coefficients in the image position calculating equations for calculating coordinate positions at four corners of the two-dimensional matrix code area are divided by a predetermined same constant to make them integers and the coordinate positions of the cell center positions are determined by calculation with the integers only.

6. The two-dimensional code reading method as defined in claim 1 wherein a constant for dividing the coefficients symbolical determined for the image position calculating equations an selected from constants frequently and commonly used in the image position calculating equations is used to divide and convert the coefficients to smaller in size coefficients to make the two-dimensional matrix code readable.

7. The two-dimensional code reading program which describes the two-dimensional code reading method defined in claim 1 by program codes executable by a computer.

8. A program recording medium which is readable by a computer and holding thereon the two-dimensional code reading program of claim 7.

9. A two-dimensional code reading method comprising processing steps of:

acquiring an image of a stack type two-dimensional code composed of a number of bar codes arranged in multiple layers in a direction perpendicular to a direction of arrangement of bars in each bar code representing data;

deciding a two-dimensional code area in the image;

setting an inspect on line identifying a center position of each of the bar codes, said inspection line joining one of two pairs of opposites of four sides representing a boundary of the decided two-dimensional code area, said pair opposite to each other in the direction of arrangement of bars in each bar code; and reproducing information of the two-dimensional code based on the inspection lines set in the inspection line setting step, wherein coefficient in image position calculating equations for calculating coordinate positions of center positions of respective cells in the two-dimensional code compensated for image inclination by adding inclination information for the two-dimensional code are calculated for setting the inspection lines on the two-dimensional cod image based on coordinate positions of four points within the two-dimensional code area decided by the two-dimensional code area decoding step.

10. The two-dimensional code reading program which describes the two-dimensional code reading method defined in claim 9 by program codes executable by a computer.

11. A program recording medium which is readable by a computer and holding thereon the two-dimensional code reading program of claim 10.

12. A two-dimensional code reading device comprising:

an image capturing portion for capturing an image of a matrix type two-dimensional code composed of a number of cells arranged in vertical and horizontal directions to form a matrix of the cells each representing binary coded data, a two-dimensional code area deciding portion for deciding a two-dimensional code area in the two-dimensional code image, an inspection line setting portion for setting inspection lines identifying a center position of each of the cells, said inspection lines each joining two paired opposites of four sides defining a boundary of the decided two-dimensional code area and a decoding portion for reproducing information of the two-dimensional code based on the inspection lines, wherein the inspection line setting portion based on coordinate positions of four points within the two-dimensional code area decided by the two-dimensional code area deciding portion calculates coefficients for image position calculating equations for determining coordinate positions of center positions of respective cells in the two-dimensional code compensated for the inclination of the image by adding inclination information for the two-dimensional code.

13. The A two-dimensional code reading device as defined in claim 12, wherein each of the image position calculating equations to determining the coordinate positions of the center positions of he respective cells in the two-dimensional code image is expressed by a recurrence formula with respect to a center position of each of the cells to reduce a volume of calculations for determining the coordinate positions of the center positions of respective ells compensated for image inclination by adding the inclination of the two-dimensional code by adding inclination information for the two-dimensional code.

14. The two-dimensional code reading device as defined in claim 13, wherein coefficients in the image position calculating equations for calculating coordinate positions at four corners of the two-dimensional code area are divided by a predetermined same constant to make them integers and the coordinate positions of the cell center positions are determined by calculation with the integers only.

15. The two-dimensional code reading device as defined in claim 13, wherein a constant for dividing the coefficients symbolical determined for the image position calculating equations a selected from constants frequently and commonly used in the image position calculating equations is used to divide and convert the coefficients to smaller in size coefficients to make the two-dimensional code readable.

16. The two-dimensional code reading device as defined in claim 12, wherein coefficients in the image position calculating equations for calculating coordinate positions at four corners of the two-dimensional code area are divided by a predetermined same constant to make integers and the coordinate positions of the cell center positions are determined by calculation with the integers only.

17. The two-dimensional code reading device as defined in clam 12, wherein a constant for dividing the coefficients symbolically determined for the image position calculating equations a selected from constants frequently and commonly used in the image position calculating equations is used to divide and convert the coefficients to smaller in size coefficients to make the two-dimensional code readable.

18. The digital camera incorporating a two-dimensional code reading device as defined in claim 12.

19. The portable telephone with a digital camera, which incorporates a two-dimensional code reading device as defined in claim 12.

* * * * *